United States Patent
Elliott et al.

(10) Patent No.: US 10,145,542 B1
(45) Date of Patent: Dec. 4, 2018

(54) ISOLATING ALIGNMENT AND STRUCTURAL STRENGTH IN LED DISPLAY SYSTEMS

(71) Applicant: Barco, Inc., Duluth, GA (US)

(72) Inventors: Grant Arthur John Elliott, Tai Po (HK); Marcus Robert Patterson, Auckland (NZ)

(73) Assignee: Barco, Inc., Duluth, GA (US)

( * ) Notice: Subject to any disclaimer, the term of this patent is extended or adjusted under 35 U.S.C. 154(b) by 276 days.

(21) Appl. No.: 14/882,237

(22) Filed: Oct. 13, 2015

Related U.S. Application Data

(63) Continuation of application No. 13/777,266, filed on Feb. 26, 2013, now Pat. No. 9,157,614, which is a continuation of application No. 12/424,338, filed on Apr. 15, 2009, now Pat. No. 8,384,616.

(60) Provisional application No. 61/045,230, filed on Apr. 15, 2008.

(51) Int. Cl.
| | |
|---|---|
| *B23P 19/00* | (2006.01) |
| *G09F 13/00* | (2006.01) |
| *F21V 21/005* | (2006.01) |
| *F21K 99/00* | (2016.01) |
| *F21S 8/06* | (2006.01) |
| *F21V 21/14* | (2006.01) |
| *G06F 3/14* | (2006.01) |
| *B23P 11/00* | (2006.01) |

(52) U.S. Cl.
CPC ............... *F21V 21/005* (2013.01); *F21K 9/30* (2013.01); *F21S 8/06* (2013.01); *F21V 21/14* (2013.01); *G06F 3/1446* (2013.01)

(58) Field of Classification Search
CPC ............. G09F 2013/0418; G09F 13/30; F21Y 2105/10; F21Y 2105/12; F21Y 2105/14; F21Y 2105/16; Y10T 29/49815; Y10T 29/4984; Y10T 29/49947; Y10T 29/49002; B23P 19/04; F16C 3/03; B29C 65/56
USPC ......... 29/426.1, 434, 525.01, 592.1; 40/549; 362/367
See application file for complete search history.

(56) References Cited

U.S. PATENT DOCUMENTS

| | | |
|---|---|---|
| 4,209,934 A | 7/1980 | Ogawa |
| 5,128,662 A | 7/1992 | Failla |
| 5,410,328 A | 4/1995 | Yoksza et al. |
| 5,424,931 A | 6/1995 | Wheeler |

(Continued)

FOREIGN PATENT DOCUMENTS

| | | |
|---|---|---|
| EP | 1365376 | 11/2003 |
| EP | 1524640 A2 | 4/2005 |

(Continued)

*Primary Examiner* — Sarang Afzali
*Assistant Examiner* — Darrell C Ford
(74) *Attorney, Agent, or Firm* — Aka Chan LLP

(57) ABSTRACT

A display system, a method of constructing a display system, and a method of displaying an image are described. In one embodiment, a display system includes a support structure having a plurality of attachment members and a plurality of tiles. Each of the plurality of tiles is attached to a corresponding attachment member of the plurality of attachment members. The support structure is configured to structurally support each of the plurality of tiles, and at least one of the plurality of tiles includes at least one connection configured to removably connect and align the at least one of the plurality of tiles with another one of the plurality of tiles.

46 Claims, 4 Drawing Sheets

(56) References Cited

U.S. PATENT DOCUMENTS

| | | | |
|---|---|---|---|
| 6,029,831 A | 1/2000 | Miller | |
| 6,065,854 A * | 5/2000 | West | G09F 9/33 211/87.01 |
| 6,252,564 B1 | 6/2001 | Albert et al. | |
| 6,314,669 B1 | 11/2001 | Tucker | |
| 6,498,592 B1 | 12/2002 | Matthies | |
| 6,704,989 B1 | 3/2004 | Lutz et al. | |
| 6,813,853 B1 | 11/2004 | Tucker | |
| 7,063,449 B2 | 6/2006 | Ward | |
| 7,071,620 B2 | 7/2006 | Devos et al. | |
| 7,102,601 B2 | 9/2006 | Devos et al. | |
| 7,204,618 B1 * | 4/2007 | Kuelbs | F21S 9/037 362/35 |
| 7,362,046 B2 * | 4/2008 | Aston | G02F 1/13336 313/498 |
| 7,682,043 B2 * | 3/2010 | Malstrom | G09F 9/33 362/147 |
| 7,766,508 B2 | 8/2010 | Villard et al. | |
| 7,893,948 B1 * | 2/2011 | Mittan | G09F 9/33 345/589 |
| 8,007,121 B2 | 8/2011 | Elliott et al. | |
| 9,874,338 B2 * | 1/2018 | Verfuerth | F21V 21/116 |
| 9,885,466 B2 * | 2/2018 | Jurewicz | F21V 21/22 |
| 9,966,366 B2 * | 5/2018 | Chen | H01L 25/0753 |
| 2002/0003592 A1 | 1/2002 | Hett et al. | |
| 2002/0097967 A1 | 7/2002 | Lowry | |
| 2002/0154259 A1 | 10/2002 | Freidhoff et al. | |
| 2002/0168157 A1 | 11/2002 | Walker et al. | |
| 2003/0015632 A1 * | 1/2003 | Dunn | A47B 81/065 248/122.1 |
| 2003/0016227 A1 | 1/2003 | Matthies | |
| 2005/0178034 A1 | 8/2005 | Schubert et al. | |
| 2005/0225733 A1 | 10/2005 | Dwyer et al. | |
| 2005/0278998 A1 | 12/2005 | Sawhney et al. | |
| 2006/0044215 A1 | 3/2006 | Brody et al. | |
| 2006/0139918 A1 * | 6/2006 | Dolgin | G02B 3/00 362/232 |
| 2006/0290596 A1 | 12/2006 | Kweon et al. | |
| 2007/0000849 A1 | 1/2007 | Lutz et al. | |
| 2007/0252056 A1 | 11/2007 | Novin | |
| 2008/0037284 A1 | 2/2008 | Rudisill | |
| 2008/0278998 A1 | 11/2008 | Cowburn et al. | |
| 2009/0010026 A1 * | 1/2009 | Gai | F21V 13/04 362/609 |
| 2009/0034241 A1 | 2/2009 | Coushaine et al. | |
| 2009/0059587 A1 * | 3/2009 | Meersman | F21K 9/00 362/249.01 |
| 2009/0310065 A1 | 12/2009 | Dunn | |
| 2014/0022517 A1 * | 1/2014 | Villeflose | G03B 21/2053 353/85 |

FOREIGN PATENT DOCUMENTS

| | | |
|---|---|---|
| FR | 2797341 A1 | 2/2001 |
| JP | 8-314014 | 11/1996 |

* cited by examiner

ISOLATING ALIGNMENT AND STRUCTURAL STRENGTH IN LED DISPLAY SYSTEMS

CROSS-REFERENCE TO RELATED APPLICATIONS

This patent application is a continuation of U.S. patent application Ser. No. 13/777,266, filed Feb. 26, 2013, issued as U.S. Pat. No. 9,157,614 on Oct. 13, 2015, which is a continuation of U.S. patent application Ser. No. 12/424,338, filed Apr. 15, 2009, issued as U.S. Pat. No. 8,384,616 on Feb. 26, 2013, which claims priority to U.S. patent application 61/045,230, filed Apr. 15, 2008. These applications are incorporated by reference.

This application is also related to U.S. patent application Ser. No. 12/424,360, filed Apr. 15, 2009, issued as U.S. Pat. No. 8,007,121 on Aug. 30, 2011, which is incorporated by reference.

BACKGROUND OF THE INVENTION

This disclosure generally relates to display units and particularly to a display system comprising groups of light emitting elements mounted to a support structure such that the display system may be easily installed and/or reconfigured while retaining both strength and positional accuracy.

Display systems for entertainment, architectural, and advertising purposes have commonly been constructed of numbers of light emitting elements such as LEDs or incandescent lamps mounted onto flat tiles. The light emitting elements can be selectively turned on and off to create patterns, graphics, and/or video displays for both informational and aesthetic purposes. It is well known to construct these displays as tiles or large panels which are assembled in position for a specific entertainment show or event or as an architectural or advertising display. Examples of such systems are disclosed in U.S. Pat. Nos. 6,813,853, 6,704,989, and 6,314,669, the disclosures of which are incorporated by reference herein for all purposes.

It can be a requirement of an event or theatrical production to use such a display but to have the display easily removable, for example in between scenes of a play or theatrical event, as the needs of the production dictate. Systems may use a tile based structure where a tile, typically around 2 ft×2 ft, can be lifted by hand and positioned. Accurate positioning of the tiles may be a time consuming and complex process involving skilled personnel.

Displays of these types may be constructed at different resolutions where the spacing between the light emitting elements can be varied. It may also be a requirement to change this spacing at different points on the display. Such systems are disclosed in U.S. Pat. Nos. 5,410,328, 7,102,601 and 7,071,620, the disclosures of which are incorporated by reference herein for all purposes. Further prior art systems, such as the VersaPixel manufactured by Element Labs, Inc. or the MiSphere system manufactured by Barco, may use suspended light emitting elements to be used as a ceiling or roof to an area. It would be advantageous to have a support and installation structure for such displays that is simple to install and that facilitates use in differing resolutions and on different planes through a single structure.

Small errors in the positioning of the pixels within tiles and tiles within a display can be cumulative and may lead to large errors in overall pixel alignment accuracy. At the same time the display support system must be strong enough to support a large area of display tiles and to withstand side loads from wind and weather if used outside. The goal of simultaneous strength, rigidity and accuracy is one that is commonly not achieved in prior art systems and the user typically has to accept a reduced accuracy in order to achieve the required strength. Accordingly, there exists a need for a display system that may be easily installed and/or reconfigured while retaining both strength and positional accuracy.

DETAILED DESCRIPTION OF THE INVENTION

Figure 1:
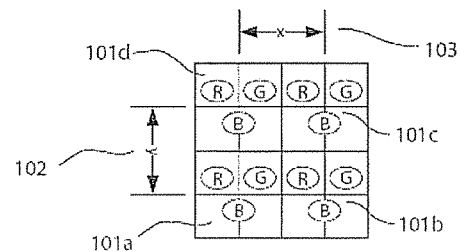
FIG. 1 shows pixels of a prior display system.

FIG. 1 shows pixels of a display system in accordance with the prior art. Each pixel 101*a*, 101*b*, 101*c*, and 101*d* may be constructed from three LEDs; e.g., red (R), green (G) and blue (B). The distance 103 and 102 between the center of a pixel and its adjacent pixels is referred to as the pixel pitch. The x-axis pixel pitch 103 may be substantially the same as the y-axis pixel pitch 102.

In a large display with a large number of pixels it is critical that the pixel pitch is controlled within tight tolerances. Errors in the pixel pitch across the display are very apparent to the viewer and adversely affect the image quality.

Figure 2:
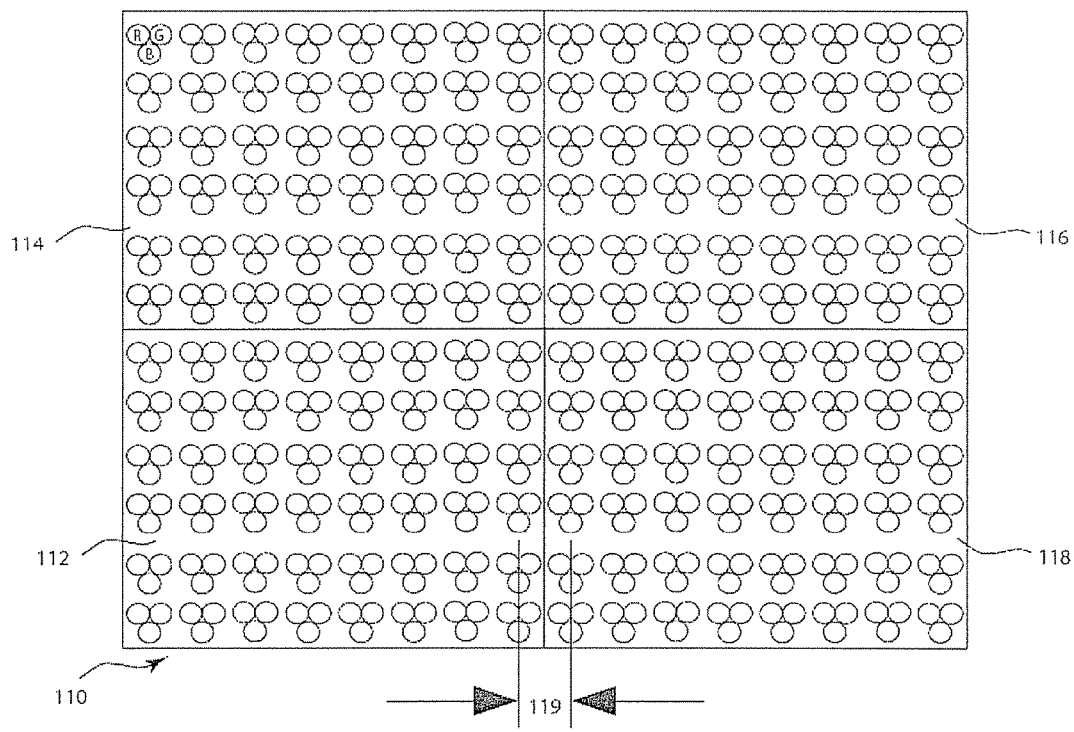
FIG. 2 shows a portion of a prior modular display system.

FIG. 2 illustrates a portion of a modular display system 110 in accordance with the prior art, where display modules 112, 114, 116, and 118 are mounted adjacent to each other to form a single display. Methods to control pixel alignment and pitch within a single module are well known in the art through such means as accurate component placement on a printed circuit board within the module housing. The modules may be constructed from plastic, and be sufficiently small that the tolerances within the modules can be tightly controlled.

However the pitch 119 between the pixels on adjacent modules is controlled by the accurate mechanical alignment and spacing of the individual modules. If this alignment and spacing is not accurately maintained gaps may appear in the display which appear darker when the screen is set to black. Additionally, banding can appear due to perceived luminance errors. For example, if the pixel pitch between modules is greater than the pixel pitch within the module, then the effective area subtended to the viewer by the pixels at the boundary is larger than those within the module. This increased effective area causes the perceived luminance of the pixels at the boundaries of the modules to be lower than the pixels within the module causing an apparent band or stripe in the image.

In the prior art, modular display systems may include a number of display modules mounted onto a larger tile in which these tiles are connected together to form the entire screen. The tiles are typically constructed from folded sheet metal, and are large compared to the modules. These tiles and their interconnection provide both the alignment of the display modules and the structural support and strength to form the mechanical infrastructure of the screen. If a screen is intended for an outdoor application then it must further be able to withstand wind loadings producing significant sideways forces.

Figure 3:
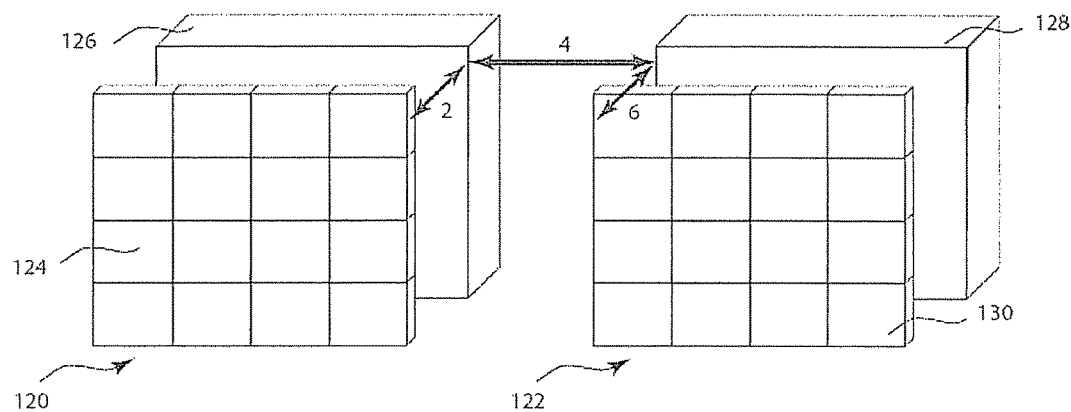
FIG. 3 shows a prior modular display system.

FIG. 3 shows a modular display system in accordance with the prior art. A plurality of display modules 124 are assembled onto a support structure 126 to form tile 120, and a second plurality of display modules 130 are assembled onto support structure 128 to form a second tile 122. Support structures 126 and 128 are interconnected to support and align the two tiles. The alignment of the display modules 124 on tile 120 with display modules 130 on tile 122 are affected by multiple and cumulative tolerances: tolerance 2 between tile 120 and support structure 126, tolerance 4 between support structure 126 and support structure 128, and tolerance 6 between support structure 128 and tile 122.

In the prior art system such tolerances may accumulate and produce a total positional error as high as ±8.25 percent (total 16.5 percent) resulting in visible and objectionable luminance difference between the pixels at the tile boundaries and the pixels within the tile. Such a gap between tiles will be noticeable to an observer and detract from a cohesive look. Although here we are referring to tolerances in a single axis, it is also important to note that these tolerances may be present and important in all three perpendicular axes x, y, and z.

The prior art uses the support structure 126 and 128 to provide both:

(i) alignment—ensuring that the tiles align to form a cohesive display; and (ii) structural support—ensuring that the screen can support itself safely as well as endure additional forces, such as from wind loading in outdoor situations.

Alignment accuracy is the primary requirement for display quality, but the large structural parts needed to simultaneously achieve the strength goals may hinder that accuracy. Achieving the tight tolerances needed with large structural components can be difficult and expensive, and almost always involves large amounts of time consuming and expensive machining.

Figure 4:
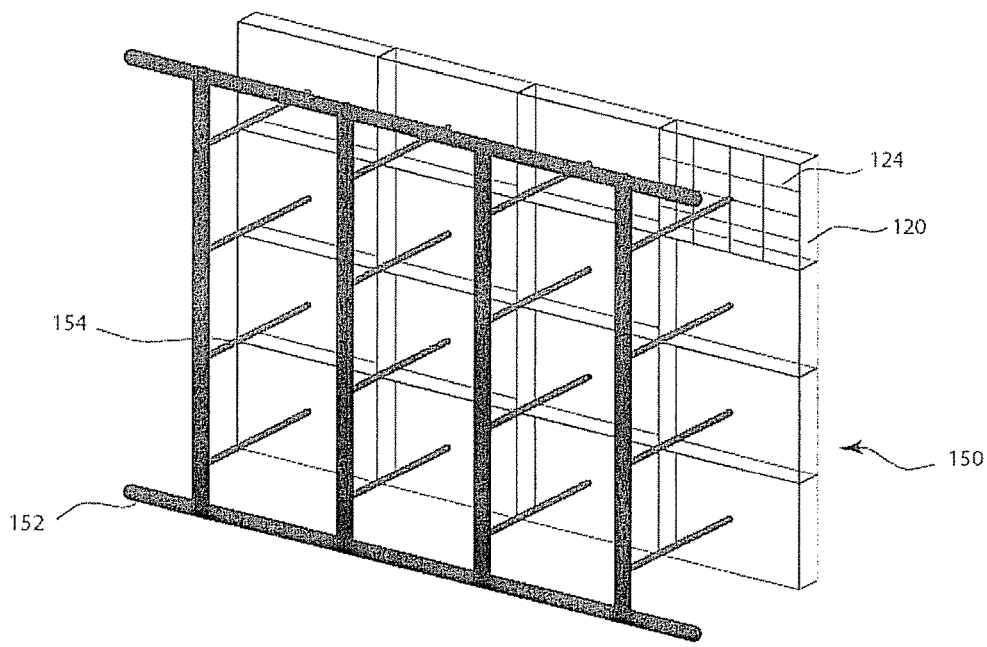
FIG. 4 shows a display system in accordance with embodiments of the present disclosure.

The present disclosure improves on the prior art and discloses means for assembling a modular display which isolate the alignment and structural requirements/functionality from each other. FIG. 4 shows a display system 150 in accordance with embodiments of the present disclosure. Multiple display modules 124 are assembled onto a plurality of tiles 120 (without the use of support structures 126 and 128). Tiles 120 may connect to adjacent tiles through at least one connection that may include clips or clamps which provide accurate and improved alignment without having a requirement (or a substantially low requirement) to provide support or strength to the system. Substantially removing the strength requirement from these components allows smaller, more accurately manufactured parts to be used and ensure highly accurate alignment. The tiles may be manufactured using injection molding or other techniques well known in the art which have inherently high levels of accuracy, as compared to the sheet metal and machining techniques used in the prior art. Thus, the video display will be accurately aligned and cohesive in its appearance.

Structural support and strength is provided though a secondary structural support 152 which is connected to the display tiles through attachment member 154 such that the alignment of the display tiles remains uncompromised. In one example, attachment member 154 includes an interconnecting member, such as a rod, and a spigot at the end of the rod, which operably couples to a tile 120. The secondary structural support 152 provides the strength required to support itself and the display tiles and to resist other applied forces such as wind loading.

To ensure that any inaccurate alignment of structural support 152 does not compromise or affect the alignment of the display tiles 120, the attachment members 154 may be constructed so as to take up or nullify any tolerance difference between the accurately aligned display tiles 120 and the structural support 152. Alignment accuracies up to an order of magnitude better than the prior art system can be provided by the separation of the functions of alignment and support. For example, in one embodiment, the attachment member 154 may be moveable or deformable in any direction with respect to the structural support 152.

Figure 5:
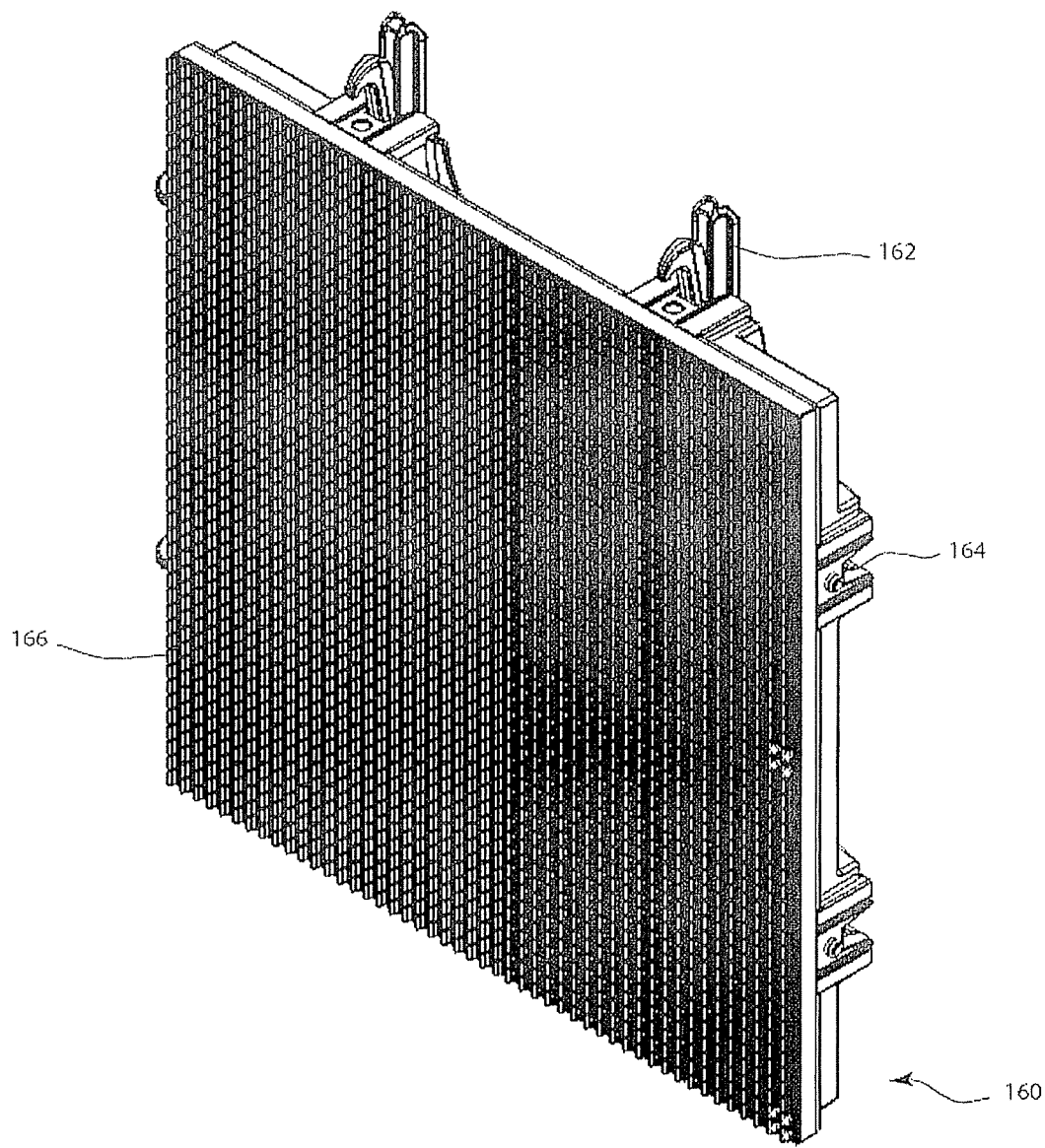
FIG. 5 shows an isometric view of a tile of a display system in accordance with embodiments of the present disclosure.

FIG. 5 shows an isometric view of a tile 160 of a display system in accordance with embodiments of the present disclosure. A plurality of pixels 166 are mounted onto a display tile 160. Display tile 160 is accurately constructed to very tight tolerances and may use injection molding or other inherently accurate manufacturing technique. The strength requirement for tile 160 is minimal, as it only needs to support itself and the attached pixels and associated circuitry. There is no requirement to provide support for adjacent tiles. Alignment between adjacent tiles 160 is provided through connections such as clips 162 and receptacles 164 in one example. Clips 162 and receptacles 164 provide highly accurate alignment of adjacent tiles 160 with no or a substantially low requirement to transmit support or strength between those tiles. This allows the use of accurate construction to very tight tolerances which may use injection molding or other inherently accurate manufacturing technique.

Figure 6:
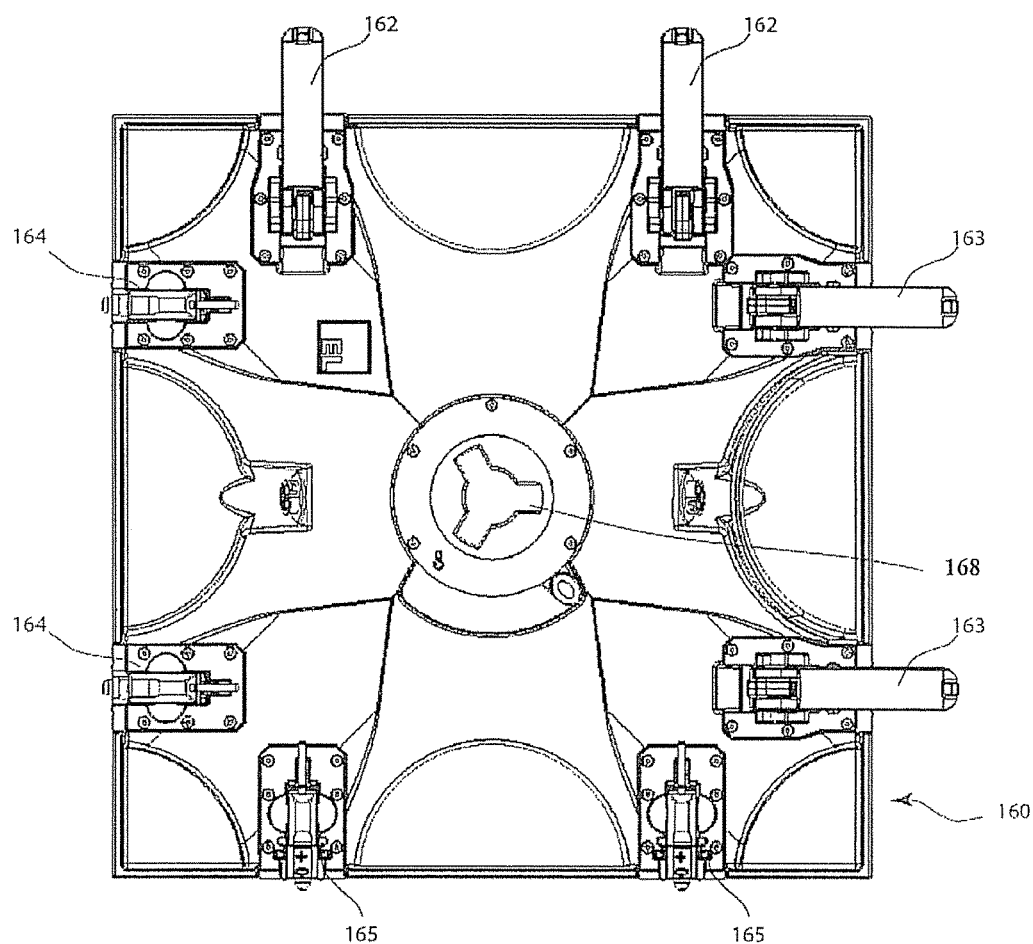
FIG. 6 shows a rear view of a tile of a display system in accordance with embodiments of the present disclosure.

FIG. 6 shows a rear view of a tile of a display system in accordance with embodiments of the present disclosure. Clips 162 on the top of a tile may connect to receptacles 165 on the bottom of the adjacent tile. Similarly clips 163 on the right of a tile may connect to receptacles 164 on the left side of the adjacent tile. Strength and support for tile 160 is provided through center attachment point 168 which connects to the attachment member 154 (FIG. 4) back to the structural support 152 (FIG. 4). Through such means a modular display of any size may be quickly and accurately constructed.

In certain embodiments, the tiles (e.g., tiles 120 or 160) may include a Printed Circuit Board (PCB) that allows a plurality of light emitting elements to be electronically connected to the tile. Further, in certain embodiments, the display system 150 (FIG. 4) may also include a power unit and/or a main processor that is electronically connected to the plurality of light emitting elements. As such, the power unit and/or the main processor may send a data and/or power signal to the plurality of light emitting elements disposed on the tiles. Based on the power signal, the plurality of light emitting elements may be selectively powered on and off or emit light with varying intensities, and based on the data signal, the plurality of light emitting elements may selectively emit light of different colors.

Advantageously, the present disclosure provides a comprehensive display system and support structure capable of providing both strength and rigidity while also presenting a high level of accuracy for tile and pixel placement.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
   providing a support structure of a display system, wherein the support system comprises a plurality of attachment members, each having a rod;
   providing a plurality of tiles of the display system, wherein each tile comprises a plurality of pixels positioned on a visual display side of the tile, each pixel comprises at least three light emitting diodes, and each of the at least three light emitting diodes of each pixel are adapted to emit one of a first color of light, a second color of light, and a third color of light, and the first, second, and third colors of light are different colors of light; and
   removably coupling a backside of a first tile of the plurality of tiles to a first rod of a first attachment member of the plurality of attachment members, wherein the backside of the first tile is an opposite side of the first tile with respect to the visual display side of the first tile, and the first rod extends in a direction of a first line that is at least partially perpendicular to the backside of the first tile that the first rod is coupled to, whereby the first tile is removable from the support structure of the display system while an adjacent tile remains coupled to the support structure.

2. The method of claim 1 wherein at least one of the plurality of tiles includes at least one connection configured to removably connect and align the at least one of the plurality of tiles with another one of the plurality of tiles.

3. The method of claim 1 comprising:
   in the display system, positioning the first tile of the plurality of tiles at a first angle with respect to the support structure; and
   positioning a second tile in a second angle with respect to the support structure, wherein the second angle is different than the first angle.

4. The method of claim 1 wherein the backside of a tile comprises at least one connection, extending outward from the backside.

5. The method of claim 1 wherein at least one of the plurality of tiles can be rotated 360 degrees with respect to the support structure.

6. The method of claim 1 wherein the support structure is separable from the plurality of tiles.

7. The method of claim 1 wherein the support structure includes a bar, removably coupled to at least three tiles of the plurality of tiles.

8. The method of claim 1 wherein the plurality of tiles forms a video display.

9. The method of claim 1 comprising in the display system, removably coupling one tile to an adjacent tile via a clip-and-receptacle mechanism that is located on the backside of the tiles and is user accessible and user actuatable from the backside of the tiles.

10. The method of claim 1 comprising removably coupling a backside of a second tile of the plurality of tiles to a second rod of a second attachment member of the plurality of attachment members, wherein the backside of the second tile is an opposite side of the second tile with respect to the visual display side of the second tile, and the second rod extends in a direction of a second line that is at least partially perpendicular to the backside of the second tile that the second rod is coupled to, whereby the second tile is removable from the support structure of the display system while an adjacent tile remains coupled to the support structure.

11. The method of claim 10 wherein the first and second rods are parallel.

12. A method comprising:
   assembling a display system comprising:
   providing a support structure comprising a plurality of rods;
   providing a plurality of tiles, wherein the plurality of tiles comprises a plurality of pixels, each pixel includes a plurality of light-emitting elements disposed on a surface of each tile of the plurality of tiles;
   removably coupling a first tile of the plurality of tiles to a first rod of the plurality of rods of the support structure, wherein at least a portion of the first rod extends in a direction of a line that is perpendicular to a backside of the first tile that the first rod is coupled to;
   removably coupling a second tile of the plurality of tiles to a second rod of the plurality of rods of the support structure, wherein at least a portion of the second rod extends in a direction of a line that is perpendicular to a backside of the second tile that the second rod is coupled to; and
   removably coupling the first tile to the second tile that is adjacent to the first tile via a first clip-and-receptacle mechanism that is located on the backside of the first tile and is user accessible and user actuatable from the backside of the first tile.

13. The method of claim 12 wherein the rods hold the tiles in an array.

14. The method of claim 12 wherein the coupled plurality of tiles can be rotated while attached to the support structure.

15. The method of claim 12 wherein each tile is removable from the support structure of the display system while an adjacent tile remains coupled to the support structure and unmoved.

16. The method of claim 12 wherein the support structure comprises a plurality of support bars that are coupled to the rods.

17. The method of claim 16 wherein the support structure comprises a plastic material.

18. The method of claim 16 comprising removing the coupled plurality of tiles from the support structure.

19. The method of claim 12 comprising:
   removably coupling a third tile of the plurality of tiles to a third rod of the plurality of rods of the support structure, wherein at least a portion of the third rod extends in a direction of a line that is perpendicular to a backside of the third tile that the third rod is coupled to; and
   removably coupling the second tile to the third tile that is adjacent to the second tile via a second clip-and-receptacle mechanism that is located on the backside of the second tile and is user accessible and user actuatable from the backside of the second tile.

20. The method of claim 12 comprising in the display system, removably coupling one tile to an adjacent tile via a clip-and-receptacle mechanism that is located on the backside of the tiles and is user accessible and user actuatable from the backside of the tiles.

21. A method comprising:
   providing a support structure of a display system, wherein the support system comprises a first bar and a second bar separated by a first distance, a plurality of attachment members, and a plurality of rods, wherein each attachment member is coupled to the first bar at a first end of the attachment member and to the second bar at a second end of the attachment member, each first and second ends of each attachment member are at opposite ends of the attachment member, adjacent attachment members are separated by a second distance that is less than the first distance, each attachment member is coupled to at least one of the rods of the plurality of rods, the first bar couples to a first attachment member of the plurality of attachment members at a first location of the first bar, the first bar couples to a second attachment member of the plurality of attachment members at a second location of the first bar, the first bar couples to a third attachment member of the plurality of attachment members at a third location of the first bar, and the first, second, and third locations are different locations, a first distance between the first and second locations is equal to a second distance between the second and third locations;

providing a plurality of tiles of the display system, wherein each tile comprises a plurality of pixels positioned on a visual display side of the tile, and each pixel comprises at least one light emitting diode that emits at least one color of light; and removably coupling a backside of at least one of the tiles of the plurality of tiles to at least one rod, wherein the backside of the tile is an opposite side of the tile with respect to the visual display side of the tile, and the at least one rod extends at least partially along a direction of a line that is perpendicular to the backside of the tile that the rod is coupled to.

22. The method of claim 21 wherein each tile in the display system is removable from the support structure of the display system while an adjacent tile remains coupled to the support structure.

23. The method of claim 21 wherein the removably coupling a backside of a tile of the plurality of tiles to the at least one rod of an attachment member of the plurality of attachment members comprises:

inserting the at least one rod of the support structure into a receptacle on the backside of the tile; and securing the at least one rod to the tile via an attachment mechanism of the tile, wherein while the attachment mechanism is engaged, the tile cannot be removed from the at least one rod until the attachment mechanism is disengaged.

24. The method of claim 23 comprising:

removing a tile from the support structure by disengaging the attachment mechanism of the tile and pulling the tile from the rod to which the tile had been secured.

25. The method of claim 23 wherein the receptacle is positioned in a center of the backside of the tile.

26. The method of claim 21 comprising:

in the display system, removably coupling one tile to an adjacent tile via a clip-and-receptacle mechanism that is accessible and actuatable from the backside of the tiles.

27. The method of claim 21 comprising:

removably coupling a backside of at least a second tile of the plurality of tiles to at least a second rod, wherein the backside of the second tile is an opposite side of the second tile with respect to the visual display side of the second tile, and the second rod extends at least partially along a direction of a line that is perpendicular to the backside of the second tile that the rod is coupled to; and coupling the at least one of the tiles to the second tile via an attachment mechanism that is actuatable from the backside of the at least one of the tiles, the backside of the second tile, or the backsides of the at least one of the tiles and the second tile.

28. The method of claim 21 wherein the first bar supports the first attachment member at the first location of the first bar, the first bar supports the second attachment member at the second location of the first bar, and the first bar supports the third attachment member at the third location of the first bar.

29. The method of claim 28 wherein the first bar vertically supports the first attachment member, the first bar vertically supports the second attachment member, and the first bar vertically supports the third attachment member.

30. The method of claim 28 wherein the first bar and the first attachment member are perpendicularly arranged, the first bar and the second attachment member are perpendicularly arranged, and the first bar and the third attachment member are perpendicularly arranged.

31. The method of claim 28 wherein the first, second, and third locations are arranged in a line on the first bar.

32. The method of claim 28 wherein the second bar couples to the first attachment member at a fourth location of the second bar, the second bar couples to the second attachment member at a fifth location of the second bar, the second bar couples to the first attachment member at a sixth location of the second bar, and the fourth, fifth, and sixth locations are different locations on the second bar.

33. The method of claim 28 wherein the fourth, fifth, and sixth locations are arranged in a line on the second bar.

34. The method of claim 21 wherein the first bar extends along a first line, the second bar along a second line, and the first and second lines are parallel.

35. The method of claim 34 wherein the first attachment member extends along a third line, the second attachment member extends along a fourth line, the third attachment member extends along a fifth line, and the third, fourth, and fifth lines are parallel.

36. The method of claim 35 wherein the first line is not parallel to the third line.

37. The method of claim 35 wherein the first line is perpendicular to the third line.

38. A method comprising:

providing a support structure of a display system, wherein the support system comprises a first bar and a second bar, a plurality of attachment members, and a plurality of rods, the first bar couples to first ends of first, second, and third attachment members, the second bar couples to second ends of the first, second, and third attachment members, the first attachment member of the plurality of attachment members is coupled to a first plurality of rods, the second attachment member of the plurality of attachment members is coupled to a second plurality of rods, and the third attachment member of the plurality of attachment members is coupled to a third plurality of rods;

removably coupling backsides of a first plurality of tiles to the first plurality of rods to form a first column of tiles;

removably coupling backsides of a second plurality of tiles to the second plurality of rods to form a second column of tiles; and removably coupling backsides of a third plurality of tiles to the third plurality of rods to form a third column of tiles, wherein the first, second, and third columns of tiles are parallel, each tile comprises a plurality of pixels positioned on a visual display side of the tile, each pixel comprises at least one light emitting diode that emits at least one color of light, and the backside of each tile is an opposite side of the tile with respect to the visual display side of the tile.

39. The method of claim 38 wherein the first and second bars are perpendicular to the first, second, and third attachment members.

40. The method of claim 38 wherein the first and second bars are parallel.

41. The method of claim 40 wherein the first, second, and third attachment members are parallel.

42. The method of claim 38 wherein each rod is perpendicular to the first and second bars and is perpendicular to the first, second, and third attachment members.

43. The method of claim 38 wherein the rods are parallel.

44. The method of claim 38 wherein each rod extends at least partially along a direction of a line that is perpendicular to the backside of a tile that the rod is coupled to.

45. The method of claim 38 wherein each tile in the display system is removable from the support structure of the display system while an adjacent tile remains coupled to the support structure and unmoved.

46. The method of claim 38 wherein the first and second bars are not parallel to the first, second, and third attachment members.

* * * * *